United States Patent [19]

Wolff

[11] Patent Number: 4,674,251
[45] Date of Patent: Jun. 23, 1987

[54] IMPROVED SCREEN COMPONENT FOR USE IN MODULAR SCREENING DECKS

[75] Inventor: Kurt Wolff, Dinslaken, Fed. Rep. of Germany

[73] Assignee: Steinhaus GmbH, Mulheim, Fed. Rep. of Germany

[21] Appl. No.: 899,290

[22] Filed: Aug. 22, 1986

[30] Foreign Application Priority Data

Dec. 3, 1985 [DE] Fed. Rep. of Germany ....... 3542635

[51] Int. Cl.$^4$ .......................... E01C 5/00; E04C 1/00
[52] U.S. Cl. .................................... 52/309.15; 404/34
[58] Field of Search ............. 52/309.15, 309.16, 169.1, 52/386, 391, 506; 404/34, 35, 40, 41

[56] References Cited

U.S. PATENT DOCUMENTS 3,775,918 12/1973 Johnson ................................ 404/34

FOREIGN PATENT DOCUMENTS 190661 7/1957 Austria ................................. 52/220

Primary Examiner—J. Karl Bell
Attorney, Agent, or Firm—Pollock, Vande Sande and Priddy

[57] ABSTRACT

A screen component for use in modular screening decks, comprising a frame-shaped plastics moulding which surrounds one or more fields having screen openings. At least two of the opposite sides of the plastics moulding have supporting members with fastening elements, between which reinforcement rods embedded in the plastics moulding extends. Premoulded plastic inserts are embedded in the supporting members and have insert openings on the sides of the inserts facing each other, into which the ends of the reinforcement rods are inserted.

9 Claims, 1 Drawing Figure

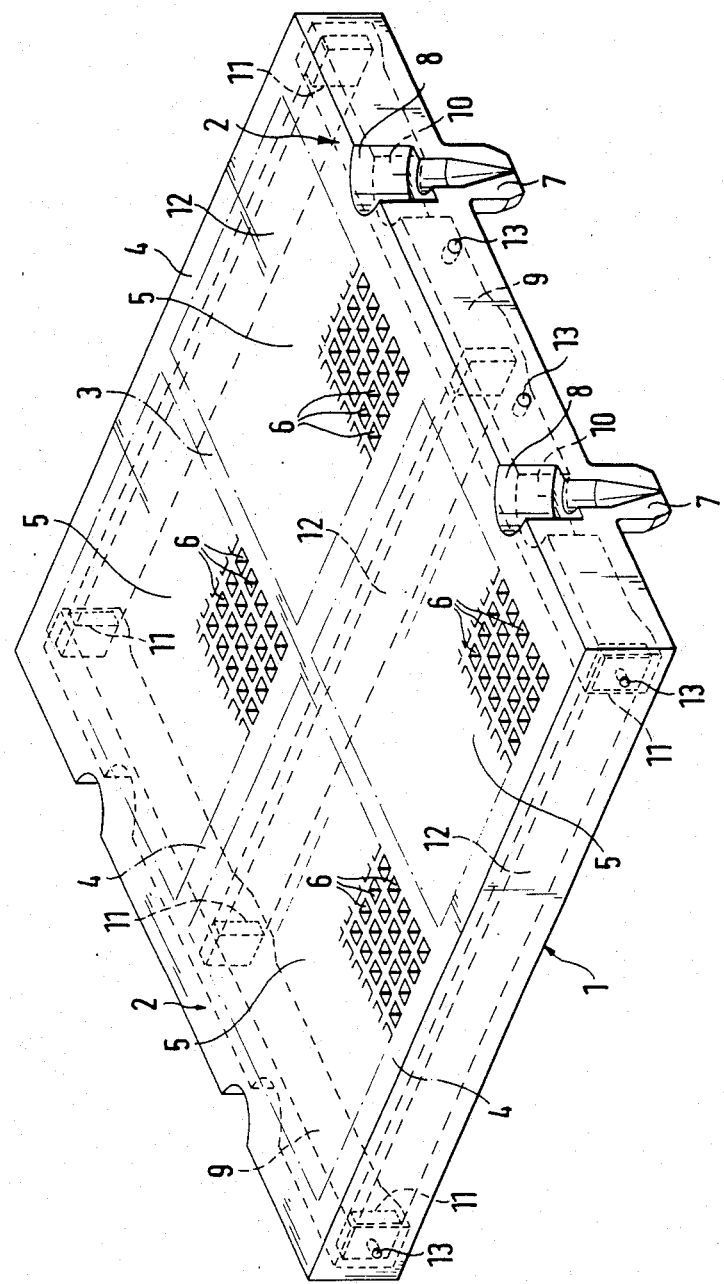

IMPROVED SCREEN COMPONENT FOR USE IN MODULAR SCREENING DECKS

BACKGROUND OF THE INVENTION

The invention relates to a screen component suitable for use in modular screening decks of the type comprising a frame-shaped plastics moulding which surrounds one or more fields having screen openings, and which has supporting members provided with fastening elements on at least two of its opposite sides, between which supporting members extend reinforcement members that are embedded in the plastics moulding.

The various designs of such screen components are known from the German periodical "Aufbereitungs Technik" (Dressing and preparation engineering), 1979, pages 383-389. In relation to the remaining longitudinal and transverse members, the support members of the plastics moulding have considerably larger cross-section, which is principally attributable to an increased width, in order to provide an adequately wide bearing surface with which the screen components may be borne on carriers of a substructure.

In the case of the known screen components, this gives rise to high accumulations of the plastics material at the supporting members, which is disadvantageous for reasons of both cost and manufacture; in particular, it has meant that up until now the manufacture of screen components by the injection-moulding process has not been able to establish itself generally.

Furthermore, it is advantageous in the case of the known screen components that the reinforcement has to consist of steel longitudinal and transverse members which are firmly connected to one another and which are welded to a rigid frame or grid. This is so since in particular the reinforcing rods embedded in the region of the supporting members have the object of avoiding a longitudinal shrinkage of the supporting members when the plastic sets, in order that the position of the fastening elements arranged on them does not change inadmissibly. However, the reinforcement in the supporting members can only achieve this object if there is a firm bond with the remaining reinforcing parts even before casting of the plastics moulding.

SUMMARY OF THE INVENTION

The present invention is now based on the object of improving a screen component for modular screening decks of the generic type described above by reducing the amount of material needed for the supporting members region of the plastics moulding, and by simplifying the design and the introduction of the reinforcement into the plastics moulding.

This object is achieved according to the invention in the case of a screen component for modular screening decks of the generic type by providing the supporting members with embedded inserts which, on the longitudinal sides thereof facing one another, have insert openings into which the reinforcement is inserted.

The particular advantages of a screen component according to the invention lie in the fact that a screen component can be manufactured with a reduced amount of material overall, both for the plastics moulding and for the reinforcement, without reducing quality and performance characteristics. This makes it possible to manufacture a screen component according to the invention by the injection-moulding process in shorter injection-moulding times because the reduced material accumulation in the region of the supporting members makes possible shorter setting times of the plastic. At the same time, it should be taken into account that the screen components are manufactured from a highly wear-resistant plastic, such as polyurethane, having a Shore A hardness of about 85, which, as a usually relatively soft plastic, is in any case problematical in injection-moulding processing. For this reason it is of further particular advantage that, according to the invention, a better flow behaviour of the plastics material which has to set is obtained because the cross-sections which have to be filled around the inserts are smaller. The amount of material needed is also reduced by the fact that the inserts can be manufactured as premouldings from a simpler, cheaper plastics material such as polyamide or PVC, while the highly wear-resistant plastic which is otherwise used for the plastics moulding is considerably more expensive. It is advantageous to select plastics which have a good adhesive affinity to each other so that an undetachable bond is produced between the premoulding and the wear-resistant plastics material of the supporting members, which can also be promoted by mould clamping elements. At the same time, the insert can in each case take up at least half the cross-section of the supporting member of the plastics moulding, it being posssible merely to provide points which are less susceptible to wear with a thinner coating of the wear-resistant plastics material over the insert while a thicker wearing coat of this plastics material may be arranged on the insert on the upper side of the screen, which is subjected to high loads.

The reinforcement of the screen components is also simplified because the insert replaces the reinforcing rods usually running in the supporting members. Owing to the far greater cross-section compared with the conventional steel reinforcements, the insert is also better able to achieve the object of preventing a shrinkage in the longitudinal direction of the supporting members when the wear-resistant plastics material sets. For this reason, screen components according to the invention are particularly dimensionally stable; above all, the position of the fastening elements is definitely fixed on the supporting members. A further simplification is possible by virtue of the fact that the reinforcement may now only consist of single transverse rods whose opposing ends merely have to be inserted into aligned insert openings in the premouldings before the entire arrangement consisting of premouldings and reinforcing rods is laid into the casting mould or injection mould.

BRIEF DESCRIPTION OF THE DRAWING

The invention is described in still more detail below for an exemplary embodiment and with reference to the drawing. The drawing shows a perspective ghost view of a screen component according to the invention.

DESCRIPTION OF THE PREFERRED EMBODIMENT

Specifically, the screen component represented in the drawing consists of a frame-shaped plastics moulding 1, which is made up of two supporting members 2 arranged on opposite sides thereof, a longitudinal member 3 lying centrally between supporting members 2, and a plurality of spaced transverse members 4 connecting the supporting members 2. These members 2 to 4 surround fields 5, in the area of which are arranged a plurality of screen openings 6. The fields 5 may be designed integrally with the members 2 to 4, but in another design they may also be produced separately and connected in a suitable way to the members 2 to 4.

In the region of the supporting members 2, the screen component has downwardly directed fastening projections 7, which protrude downward beyond the underside of the supporting members 2. In the position for use, the screen component rests with its supporting members 2 on carriers of a supporting substructure, the fastening projections 7 protruding through holes in the carriers and being pressed apart by means of spreading pins on their underside. For the countersunk accommodation of such spreading pins, the supporting members 2 have recesses 8 which open upward into the side edges of the frame 1.

Embedded into each of the two supporting members 2 as an insert is a premoulding 9, which is adapted in its configuration to the shape of the supporting members. The premouldings 9 therefore extend substantially over the entire length of the supporting members 2; they reach almost up to its inner and outer side surfaces and up to the bottom surfaces, and only on the upper side of the screen component is there a thicker coat of plastics material of the plastics moulding 1 on the premouldings 9. While otherwise the plastics moulding 1 consists of a highly wear-resistant plastic such as polyurethane, the prefabricated premouldings 9 are produced from a simpler plastic, such as polyamide or PVC. In the region of the recesses 8 of the supporting members 2, the premouldings 9 have further recesses 10 which, inside the supporting members 2, run around and are equidistant from the recesses 8 of the supporting members 2. The recesses 10 act in addition as positive anchoring elements between the premouldings 9 and the material of the plastics moulding 1. For this purpose, the premouldings 9 may also have further or other protuberances or recesses.

Embedded in the tranverse members 4 connecting the supporting members 2 are reinforcing rods 12 which are connected to one another merely via the premouldings 9. For this purpose, the premouldings 9 have on their inner sides opposite each other insert openings 11, which accommodate the ends of the reinforcing rods 12. The insert openings 11, in each case holding one reinforcing rod 12, are aligned opposite each other so that the reinforcing rods 12 may be of straight design and can be merely fitted together with the premouldings 9 without further means of connection. In a preferred design, the rods 12 have an edgewise arranged rectangular cross-section, corresponding in size and shape to the insert openings 11 of the premouldings 9.

The premouldings 9, including the reinforcing rods 12 prefitted to them, are laid into the mould of the frame 1 before the casting or injection process. In order that they can be definitely fixed in the mould in a predetermined position, premouldings 9 have several spacer cams 13 arranged in suitable positions, which at the same time also represent further anchoring elements between the material of the plastics moulding 1 and the premouldings 9.

I claim:

1. Screen component for use in modular screening decks, comprising a frame-shaped plastics moulding which surrounds one or more fields having screen openings and which has on at least two of its opposite sides supporting members and fastening elements, a reinforcement being embedded in the plastics moulding and extending between said supporting members, characterized in that embedded in the supporting members are inserts which have longitudinal sides facing each other, said longitudinal sides of said inserts being provided with inserts openings into which the reinforcement is inserted.

2. Screen component according to claim 1, characterized in that the inserts are surrounded on all sides thereof by the plastic of the plastics moulding.

3. Screen component according to claim 1 or 2, characterized in that the fastening elements comprise an area of said plastics moulding having recesses which open into a side edge of the supporting members, and the inserts extend through said recess area of said plastics moulding and have further recesses running around and equidistant from the first-mentioned recesses.

4. Screen component according to one of claims 1 or 2, characterized in that the inserts are premouldings of a plastics material.

5. Screen component according to claim 4, characterized in that the inserts consist of a simple plastic, such as polyamide or PVC, and the plastics moulding consists of a high-grade plastic, such as polyurethane.

6. Screen component according to one of claims 1 or 2, characterized in that the reinforcement consists of individual rods.

7. Screen component according to claim 6, characterized in that the reinforcing rods are of straight design, the opposing ends of each of said rods being inserted into mutually aligned insert openings of spaced ones of the inserts.

8. Screen component according to one of claims 1 or 2, characterized in that the inserts have protuberances and/or recesses, at which the material of the plastics moulding is positively anchored.

9. Screen component according to one of claims 1 or 2, characterized in that the inserts have spacer cams for the positional fixing of the casting mould or injection mould of the plastics moulding.

* * * * *